United States Patent [19]
Fujikawa et al.

[11] Patent Number: 5,792,271
[45] Date of Patent: Aug. 11, 1998

[54] SYSTEM FOR SUPPLYING HIGH-PRESSURE MEDIUM GAS

[75] Inventors: Takao Fujikawa, Takasago; Takahiko Ishii, Osaka; Tomomitsu Nakai; Yoshihiko Sakashita, both of Takasago, all of Japan

[73] Assignees: Kabushiki Kaisha Kobe Seiko Sho, Kobe; Nihon Shinku Gijutsu Kabushiki Kaisha, Chigasaki, both of Japan

[21] Appl. No.: 845,821

[22] Filed: Apr. 28, 1997

[30] Foreign Application Priority Data

Apr. 26, 1996 [JP] Japan .................................. 8-107782

[51] Int. Cl.$^6$ .................................................. C23C 14/80
[52] U.S. Cl. ........................ 118/719; 118/725; 219/74; 219/390; 219/420
[58] Field of Search .......................... 118/725, 719; 219/74, 390, 420

[56] References Cited

FOREIGN PATENT DOCUMENTS 58-40976  9/1983  Japan .
58-50237  11/1983  Japan .

*Primary Examiner*—Richard Bueker
*Attorney, Agent, or Firm*—Oblon, Spivak, McClelland, Maier & Neustadt, P.C.

[57] ABSTRACT

The present invention provides a system for supplying a high-pressure medium gas suitable for processing a semiconductor to be processed by heating under isostatic pressure in a short cycle.

The system includes a gas holder containing a high-pressure medium gas, a compressor for pressurizing the high-pressure medium gas supplied from the gas holder, a high-pressure vessel having a heater, an accumulator for storing the high-pressure medium gas pressurized by the compressor, a first evacuation unit for evacuating the inside of a pipeline for the high-pressure medium gas, a vacuum casing for holding the opening of the high-pressure vessel in a vacuum, a second evacuation unit for evacuating the inside of the vacuum casing, and a valve unit for connecting the high-pressure vessel and the accumulator so that series connection and parallel connection can be switched on the outlet side of the compressor.

9 Claims, 4 Drawing Sheets

SYSTEM FOR SUPPLYING HIGH-PRESSURE MEDIUM GAS

BACKGROUND OF THE INVENTION

1. Field of the Invention

The present invention relates to a system for supplying a clean high-pressure medium gas containing no impurity particles in an apparatus for various processes employing the pressure of a high pressure gas, and particularly to a system for supplying a high-pressure medium gas suitable for processing a semiconductor in a short cycle. In processing a semiconductor, high-pressure processing is investigated in which a silicon wafer as a workpiece to be processed is processed by a sheet-type apparatus for processing silicon wafers one by one in synchronism with a processing cycle such as sputtering. In this case, a high-pressure medium gas must be supplied within a short time. The present invention also relates to a system for supplying a high-pressure medium gas which can comply with demand for pressurization within a short time.

2. Description of the Related Art

As a process which employs the force of a high pressure gas, HIP process is known in which a workpiece to be processed, such as a metal, ceramic or the like, is processed under isostatic pressure in an inert gas atmosphere of a high temperature and a high pressure by using an HIP apparatus comprising a high-pressure vessel having an electric furnace provided therein.

A system for supplying a high-pressure gas to this HIP apparatus mainly comprises a gas collecting device 100 as a source of a high-pressure gas medium, a gas compressor 101, and a pressure vessel body 102, as shown in FIG. 2. This system is designed so that, during operation, pipelines are switched by valves. The pipelines include a pipeline for charging a gas directly to the pressure vessel 102 having a heater 103 from the gas collecting device 100, a pipeline for connecting the above devices in series to supply the gas pressurized by the gas compressor 101 directly to the pressure vessel 102, a pipeline for recovering the high-pressure gas directly to the gas collecting device 100 from the pressure vessel 102 after processing, and a pipeline for forcing the gas to be recovered to the gas collecting device 100 from the pressure vessel 102 through the gas compressor 102.

The system shown in FIG. 2 further comprises a heating power supply 104, a water-cooling jacket 105 and a vacuum pump 106.

However, even in HIP processing, some materials to be processed are damaged due to oxidation by impurities such as oxygen mixed with an inert gas such as argon or the like used as a hydraulic medium. Therefore, as a gas supply system for the HIP apparatus for processing such a material, a system is proposed in which a reactor filled with a metal having high affinity for oxygen in order to remove oxygen by heating is connected with a compressor in series, as shown in FIG. 3 (Japanese Utility Model Publication No. 58-40976, referred to as "conventional example 1" hereinafter).

As shown in FIG. 3, in a hot isostatic pressing apparatus, a high-pressure medium gas in a gas holder 201 is forced, through a compressor 202, into a high-pressure vessel 200 in which a workpiece to be processed is inserted so that the workpiece is subjected to hot isostatic press processing in a gas atmosphere of a high temperature and a high pressure in the vessel 200 and the high-pressure medium gas in the vessel 200 is then recovered to the high-pressure medium gas holder 201. In this apparatus are provided a gas supply line 203 for supplying the high-pressure medium gas to the high-pressure vessel 200 from the high-pressure medium gas holder 201, and a gas recovery line 204 for recovering the high-pressure medium gas to the high-pressure medium gas holder 201 from the high-pressure vessel 200, the compressor 202 and a reactor 205 filled with a metal having high affinity for oxygen and provided with a heater 206 being connected to the gas supply line 203 in series.

The use of the HIP apparatus for industrial production has a problem with respect to a long cycle time. Thus, investigation has also been made to reduce the time required for pressurizing gas by a compressor. In the general HIP apparatus shown in FIG. 2, the gas compressor is operated only when the high-pressure vessel is pressurized and when the high-pressure gas is forced to be recovered to the gas collecting device from the high-pressure vessel. In the process in which the pressure and temperature are maintained (generally 1 to 5 hours), the gas compressor is stopped. It is thus necessary to improve the utilization of the gas compressor and reduce the pressurizing time.

Accordingly, an apparatus is proposed in which the high-pressure vessel as a body and a high-pressure intermediate vessel are arranged in parallel on the outlet side of the gas compressor so that when no gas is supplied to the body vessel, the body vessel is switched to the intermediate vessel by a valve, and during processing, the high-pressure gas is supplied to the body high-pressure vessel from the intermediate vessel by employing a pressure difference until the pressures in the body high-pressure vessel and the intermediate vessel are substantially balanced (Japanese Utility Model Publication No. 58-50237, referred to as "conventional example 2" hereinafter).

In FIG. 4, a hot isostatic processing apparatus comprises components including a gas holder 300 as a high-pressure medium gas supply source, a high-pressure vessel 301 containing a workpiece to be processed in which hot isostatic processing is performed, and a compressor 302. Besides the above components, the apparatus further comprises an intermediate vessel 303 for intermediately storing a high-pressure medium gas, lines for connecting the gas holder 300 and the compressor 302 in series and connecting the intermediate vessel 303 and the high-pressure vessel 301 in parallel to the gas holder 300 and the compressor 302, and bypass lines 304 and 305 for connecting the line for connecting the compressor 302 and the high-pressure vessel 301 and the line for connecting the compressor 302 and the intermediate vessel 303, respectively, to the inlet side of the compressor.

In employing a high-pressure gas for processing a silicon semiconductor, it is most important that no fine powder particle adheres to the surface of the workpiece to be processed in order to prevent deterioration. Although the method disclosed in the above conventional example 1 can be applied for preventing oxidation, a material which generates no powder particles is used for a heater and a thermal insulator in the high-pressure vessel, or a filter is provided in a pipeline for the high-pressure gas in order to prevent generation of particles and contamination therewith. Although this method can prevent generation of particles and contamination therewith to some extent, an advantageous proposal has not been made yet.

With respect to reduction in the pressurizing time, in the above conventional example 2, it is assumed that the apparatus has a gas charge by volume of as large as several tens to several m³, and the time of one processing cycle is 1 hour more.

In sheet-type high-pressure gas processing of silicon wafers, as described above, it is important to 1) prevent contamination with contaminants including particles, and 2) perform processing in a short cycle of several minutes/cycle in synchronism with a process such as sputtering. At present, conventional apparatuses cannot always comply with these requirements.

SUMMARY OF THE INVENTION

Accordingly, it is an object of the present invention to provide a system for supplying a high-pressure medium gas which can solve the problems of conventional apparatus.

In order to achieve the object, the present invention provides a system for supplying a high-pressure medium gas used in an apparatus for processing a workpiece to be processed by heating in an atmosphere of a high-pressure gas in a high-pressure vessel having a heater, the apparatus comprising the following means.

In accordance with the present invention, the system comprises a gas holder containing a high-pressure medium gas, a compressor for pressurizing the high-pressure medium gas supplied from the gas holder, a high-pressure vessel having a heater, a pressure accumulator for accumulating the high-pressure medium gas pressurized by the compressor, first evacuation means for evacuating the inside of a pipeline for the high-pressure medium gas, a vacuum casing for maintaining the opening of the high-pressure vessel, second evacuation means for evacuating the inside of the vacuum casing, and valve means for connecting the high-pressure vessel and the pressure accumulator so that series connection and parallel connection can be switched on the outlet side of the compressor. This construction enables high-pressure gas processing in a very clean atmosphere and in a very short cycle.

In accordance with the present invention, the gas pressure in the pressure accumulator is higher than processing pressure in the high-pressure vessel, and the amount Va of the gas contained in the pressure accumulator under standard conditions is preferably $(1/(1-Pp/Pa))$ times as large as the amount Vp of the gas charged in the high-pressure vessel under standard conditions, wherein Pp is the processing pressure in the processing vessel, and Pa is the highest discharge pressure of the compressor.

In the system for supplying a high pressure gas, the gas flow rate Q of the compressor under standard conditions is $Q \geq Vp/t_o$ ($t_o$: the time of one processing cycle) so that the system can be smoothly operated.

In order to remove particles, it is recommended to provide a filter in a pipeline including the high-pressure accumulator and extending from the high-pressure accumulator to the processing high-pressure vessel.

Furthermore, in order to prevent contamination by removing gas components adsorbed in the pipeline, and air mixed during disassembly and assembly of the apparatus, it is recommended to connect the first vacuum exhaust means for evacuating the inside of the high-pressure pipeline so as to evacuate through the inside of the processing high-pressure vessel.

Further, in order to decrease the processing cost by decreasing the amount of wastage of the high-pressure medium gas used, part of the gas used must be recovered, and it is thus recommended to connect a tank for supplying the high-pressure gas hydraulic medium and a tank for containing the recovered gas in parallel through a valve.

DESCRIPTION OF THE PREFERRED EMBODIMENT

A preferred embodiment and an example of the present invention will be described below with reference to the drawings.

Figure 1:
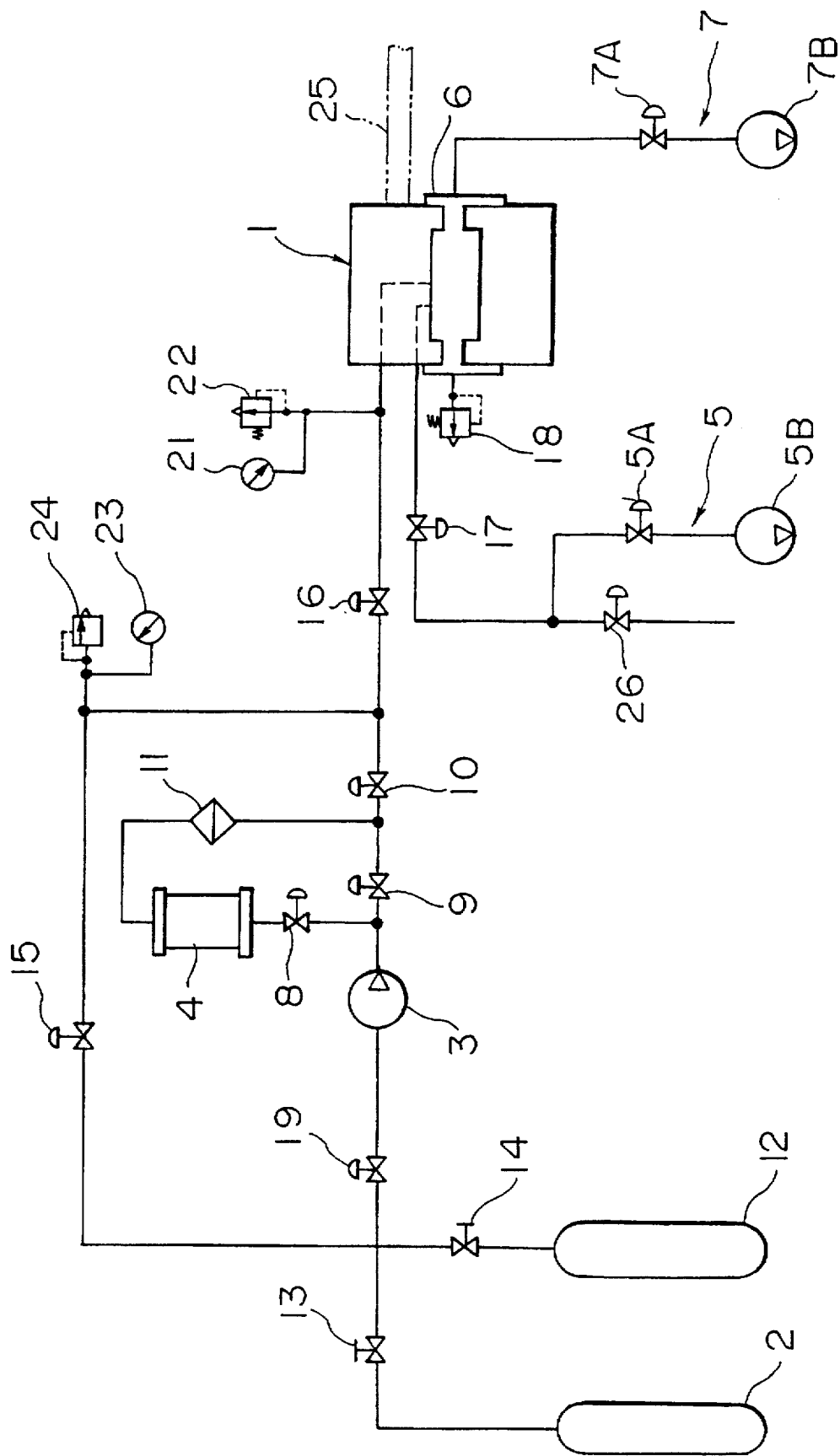
FIG. 1 is a drawing illustrating the whole construction of an embodiment of the present invention.
Figure 2:
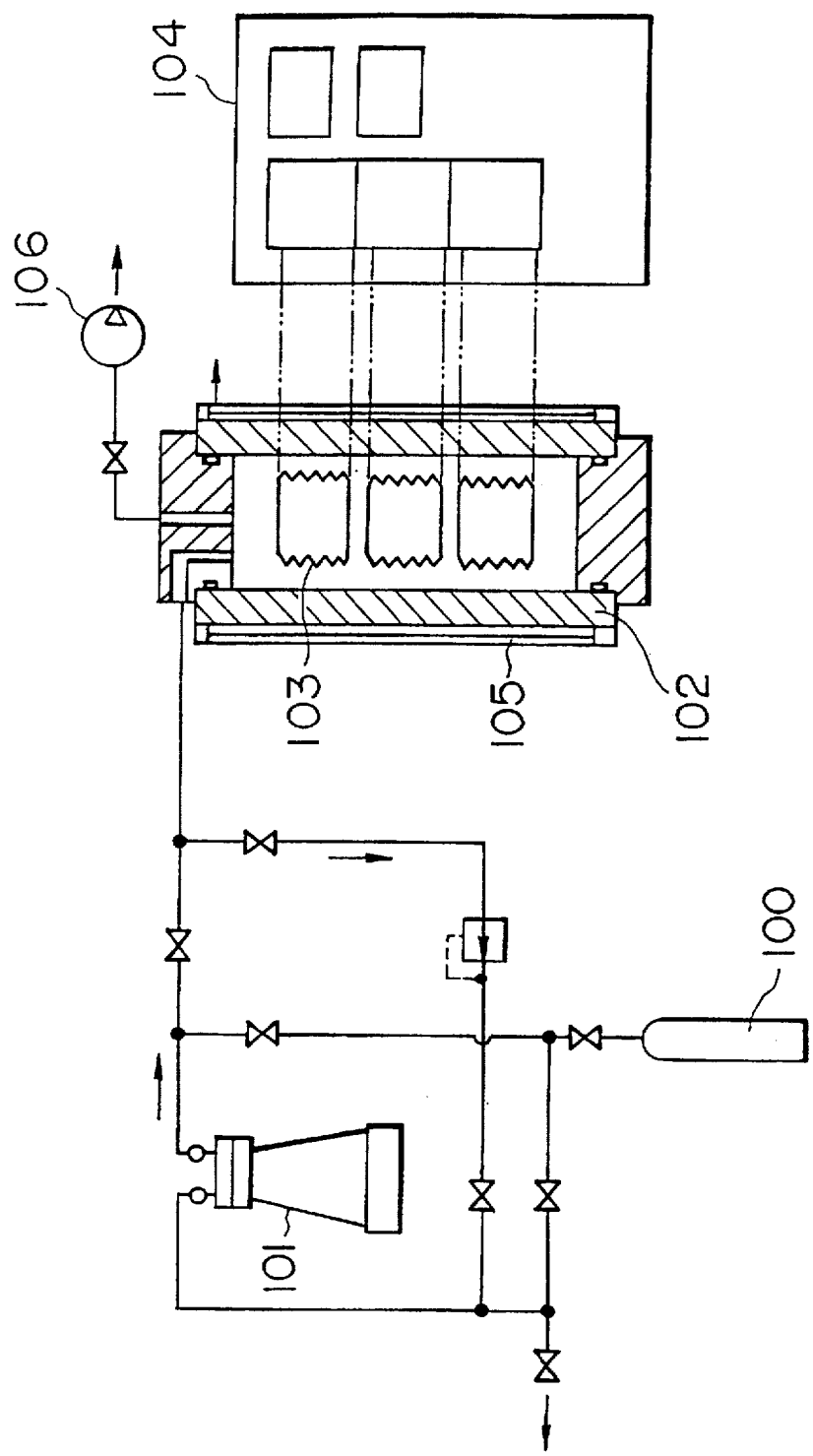
FIG. 2 is a drawing illustrating the whole construction of a general HIP apparatus.
Figure 3:
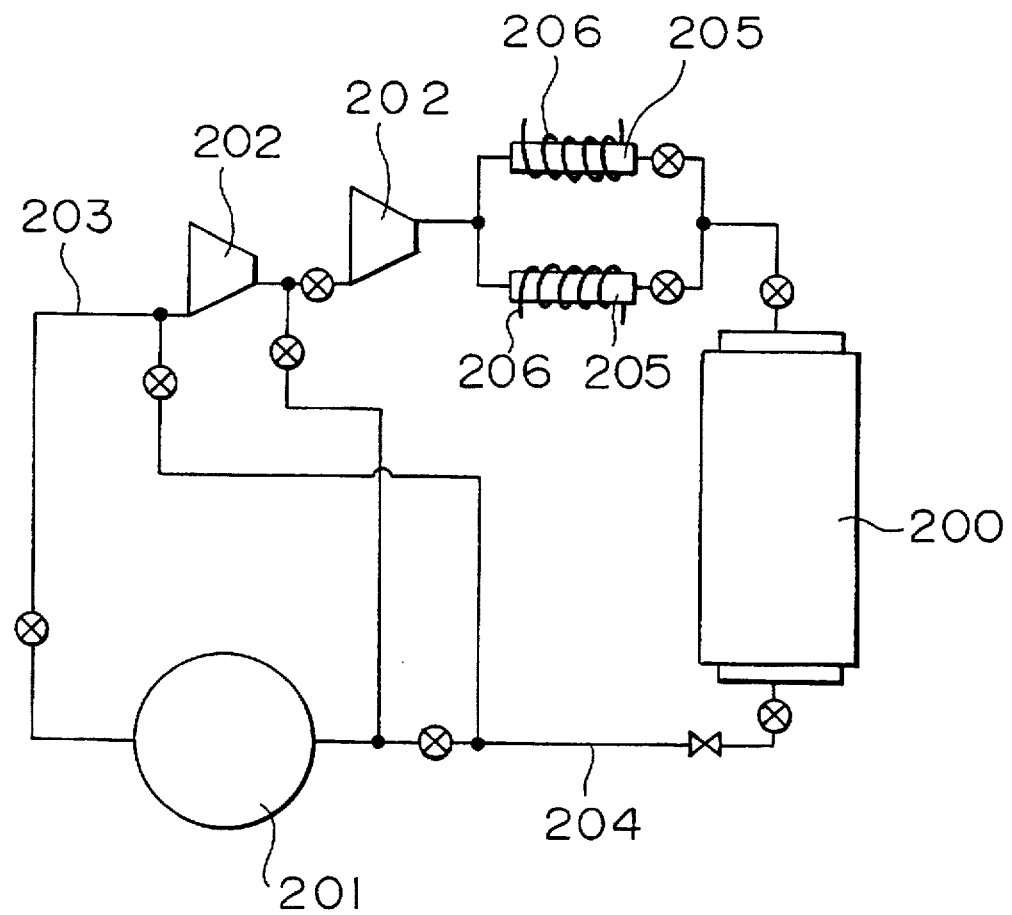
FIG. 3 is a drawing illustrating the whole construction of conventional example 1.
Figure 4:
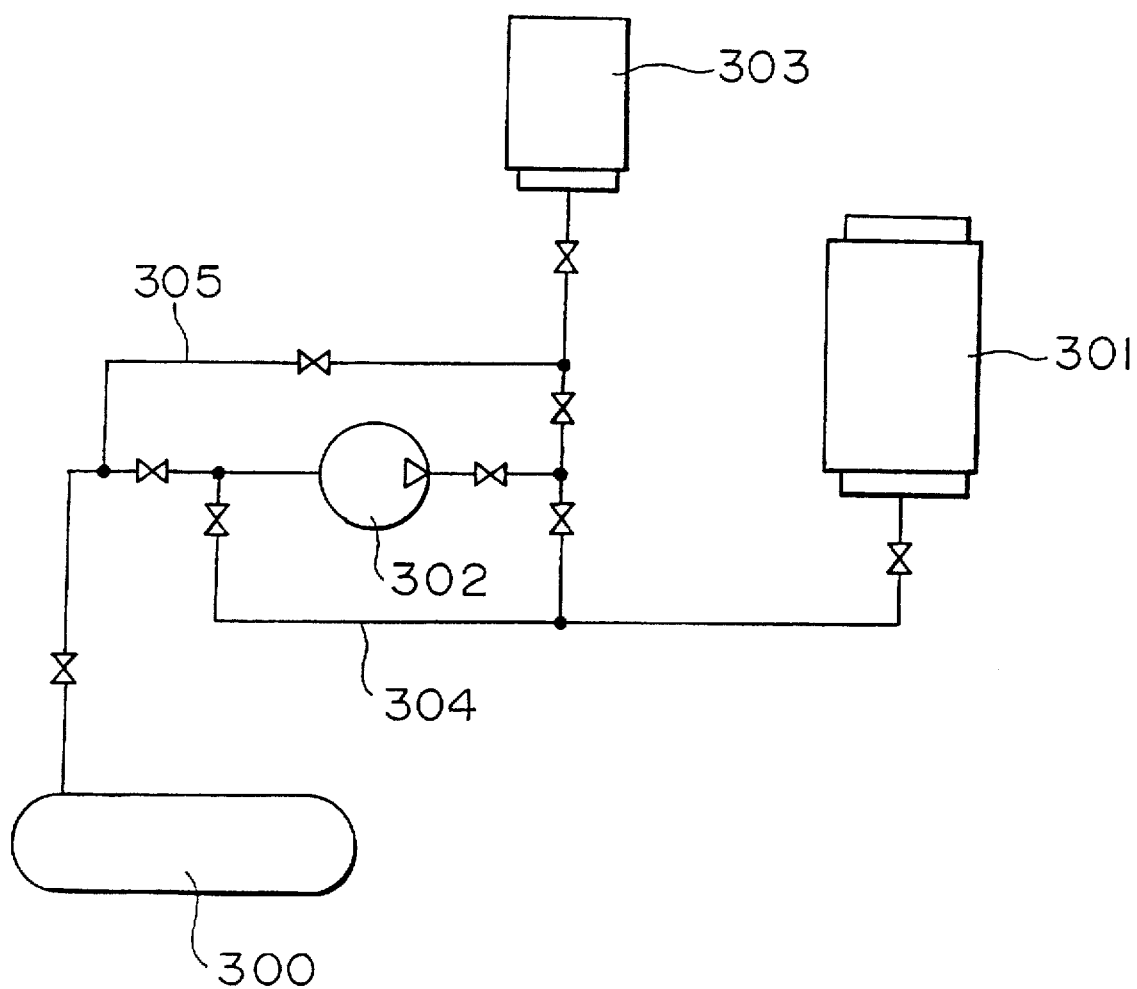
FIG. 4 is a drawing illustrating the whole construction of conventional example 2.

FIG. 1 shows the construction of a high-pressure gas processing apparatus having a supply system for a high-pressure medium gas in accordance with the present invention.

In a processing high-pressure vessel 1 is incorporated an electric resistance heating type heater, i.e., a heater employing Joule heat, and the opening of the high-pressure vessel 1 through which a silicon wafer as a workpiece to be processed is loaded and unloaded is surrounded by a vacuum casing 6 so as to maintain the opening in vacuum. The vacuum casing 6 is connected so as to transfer the silicon wafer from a sputtering device through a gate value (not shown).

The system for supplying the high-pressure medium gas to the processing high-pressure vessel 1 serving as a body comprises a high-pressure gas hydraulic medium supply tank (gas holder) 2, a gas compressor 3 for pressurizing the high-pressure medium gas, first evacuation means 5 comprising an on-off valve 5A and a pump 5B for evacuating the inside of the high-pressure gas pipeline, second evacuation means 7 having an on-off valve 7A and a pump 7B for evacuating the inside of the vacuum casing 6, pipes for connecting these devices, valves 8, 9, 13, 14 and 15, pressure gages 21 and 23 as sensors necessary for controlling pressure, and safety valves 22 and 24 for preventing excessive increase in pressure. The high-pressure vessel 1 can be cooled by cooling means 25.

Each of the main components and the operation of the whole system will be described below with reference to an actual operation example.

Conditions when operation is started after the whole apparatus is stopped for inspection or the like or operation is started immediately after installation of the apparatus are different from conditions when a material to be processed is stationarily processed by a line operation method. Therefore, these two types of conditions are separately described below.

When operation is started after the apparatus is stopped, or immediately after the apparatus is installed, the insides of not only the high-pressure gas pipeline but also the vacuum casing 6 or the inner sides of the processing high-pressure vessel 1 are generally exposed to air. Thus, each of the devices adsorbs water contained in air. In order to prevent impurity contamination of the material to be processed, the air in all parts excluding the high-pressure gas hydraulic medium supply tank 2, and air remaining in the pipeline are removed by driving the first evacuation means 5 for evacuating the high-pressure gas pipeline, with all concerned valves opened. At the same time, it is, of course, preferable that a current is passed through the inner heater of the processing high-pressure vessel 1 to heat the body portion and accelerate removal of impurities such as gases adsorbed on the body portion. However, heating is not a necessary condition.

After such clarification of the high-pressure gas pipeline, the valves 13, 19 and 8 are opened, the valves 9 and 10 are closed, and the gas compressor 3 is driven to force the high-pressure medium gas into the high-pressure accumulator 4, for example, to the highest discharge pressure Pa of the gas compressor 4. At this time, the inside of the processing high-pressure vessel 1 is controlled to an actual processing temperature in the final stage.

As described above, when operation is started after the apparatus is stopped or immediately after the apparatus is installed, after starting operation is completed, stationary operation is carried out. However, in actual, in several times of processing in the initial stage, cleanliness in the apparatus is frequency insufficient, and it is thus recommended that a dummy sample or a sample having the getter function is processed 5 to 10 times. The operation is as follows.

After a silicon wafer as a workpiece to be processed is placed in the processing high-pressure vessel 1, the opening of the high-pressure vessel 1 is closed, the valves 10 and 16 are opened, and a high-pressure gas is injected into the processing high-pressure vessel 1 from the high-pressure accumulator 4 by employing a pressure difference. When the value of the pressure gage 21 reaches a predetermined pressure (processing pressure Pp), the valve 16 is closed.

In supply of the gas by a pressure difference, the gas compressor is operated, and the gas compressor is controlled so that it is stopped by a signal of the pressure gage 23 when the pressure in the pipeline for the high-pressure accumulator 4 becomes excessive, and it is re-started when the pressure becomes lower than the predetermined value. The processing high-pressure vessel 1 may be initially filled with the high-pressure medium gas from the high-pressure gas hydraulic medium tank 2 through the values 13, 15 and 16.

After the step of maintaining the temperature for several tens seconds to several minutes is completed, the gas is recovered from the processing high-pressure vessel 1 to reduce the pressure.

After processing, the gas is recovered to the recovered gas storage tank 12 through the valves, 16, 15 and 14. When the rate of recovery is decreased due to pressure balance, the gas remaining in the processing high-pressure vessel 1 is discharged to atmosphere through the valves 17 and 26. In actual, since the rate of gas discharge is decreased when the pressure becomes 1.2 to 3 kgf/cm$^2$ which is close to the atmospheric pressure, the first evacuation device 5 for evacuating the high-pressure gas pipeline is driven to force the residual high-pressure medium gas to be exhausted, to finally decrease the pressure to a predetermined degree of vacuum.

After the pressure is reduced, the processing high-pressure vessel 1 is opened, the silicon wafer is transferred from the vacuum casing 6 to the other processing step, and a next wafer to be processed is introduced into the high-pressure vessel 1 and processed by repeating the above operations.

In the above operations, in order to realize smooth operations, relation between the gas charge (Vp under standard conditions), i.e., the size, of the processing high-pressure vessel 1, the amount of the gas contained in the high-pressure accumulator (Va under standard conditions), the processing pressure Pp, the gas pressure in the high-pressure accumulator or the highest discharge pressure Pa of the gas compressor, the cycle time $t_0$ of one cycle, and the amount (flow rate Q under standard conditions) of the gas discharged from the gas compressor is very important. The preferable relation will be described below.

When the processing pressure of the processing vessel 1 is Pp, and the pressure of the high-pressure accumulator 4 is Pa, the capacity of the high-pressure accumulator, i.e., the amount Va (under standard conditions) of the gas contained therein is recommended to be $(1/(1-Pp)/Pa)$ times as large as the amount of the gas charged in the processing high-pressure vessel 1 under standard conditions. In this case, it is basically assumed that the high-pressure accumulator at Pa≧Pp is used. The above relation permits the volume of the high-pressure accumulator 4 to be determined according to a permissible rate of pressure reduction in the high-pressure accumulator 4 when the gas is introduced into the processing high-pressure vessel 1 from the high-pressure accumulator 4.

In order to restore the reduction in pressure of the high-pressure accumulator 4, the amount Vp of the gas charged in the processing high-pressure vessel 1 for one time of processing must be supplied by driving the gas compressor within the one cycle time $t_0$. The gas flow rate Q of the gas compressor under standard conditions is $Vp/t_0$ or more.

Since the gas compressor 3 and the valves frequently have sliding portions, the operations cause irreversible generation of particles due to wear in the processing step. In order to minimize the inflow of these particles to the processing high-pressure vessel 1, a filter 11 is preferably provided for capturing these particles. If the high-pressure accumulator 4 has a capacity of 10 litter or more, particles having a relatively large size and generated in the gas compressor 1 and the valves in the lines to the high-pressure accumulator 4 are settled in the high-pressure accumulator 4 due to a decrease in the flow rate therein. In order to remove particles leaking from the high-pressure accumulator 4 and fine particles which are hard to settle, it is recommended to provide the filter in the pipeline from the high-pressure accumulator 4 to the processing high-pressure vessel 1.

EXAMPLE

An apparatus comprising a processing high-pressure vessel having a gas charge by volume of 2000 cm$^3$ was operated under conditions of Pp of 800 kgf/cm$^2$ and 400° C. (the gas charge amount Vp under standard conditions=0.627 Nm$^3$) in a cycle time of 5 minutes. In a high-pressure accumulator, the gas charge by volume was 20000 cm$^3$, and the charging pressure Pa was 900 kgf/cm$^2$ (Va under standard conditions= 10.33 Nm$^3$). In a gas compressor (highest discharge pressure 900 kgf/cm$^2$), the flow rate under standard conditions was 10 Nm$^3$/h (inlet pressure 100 kgf/cm$^2$). Va/Vp was 15.1, and $1/(1-Pp/Pa)$ was 8.999. After the processing high-pressure vessel was filled with a gas from the high pressure accumulator for about 1 minutes by a pressure difference, the gas pressure in the high-pressure accumulator was about 840 kgf/cm$^2$. In this embodiment, Vp/to was 7.524. In the repeated operations, even if the gas pressure in a high-pressure medium gas supply tank was decreased to 70 kgf/cm$^2$ from about 10 kgf/cm$^2$, and the effective Q value was thus decreased, substantially smooth operations could be carried out.

As described above, the present invention enables high-pressure gas processing in a short cycle in a very clean atmosphere. Particularly, processing such as elimination of holes remaining in the lower portion of an Al alloy interconnecting film which is formed in a silicon wafer by a sputtering method can be carried out substantially synchronously with film deposition processing in the sputtering apparatus, and wafers can be continuously subjected to from sputtering to high-pressure processing one by one. The present invention thus significantly contributes to future improvement in reliability of semiconductors and improvement in yield in the field of semiconductor manufacture.

What is claimed is:

1. A system for supplying a high-pressure medium gas used for an apparatus for processing a workpiece to be processed by heating in an atmosphere of a high-pressure gas in a high-pressure vessel having a heater, the system comprising:

a gas holder containing a high-pressure medium gas;

a compressor for pressurizing the high-pressure medium gas supplied from the gas holder;

a high-pressure vessel having a heater;

a pressure accumulator for storing the high-pressure medium gas pressurized by the compressor;

first evacuation means for evacuating a pipeline for the high-pressure medium gas;

a vacuum casing for holding the opening of the high-pressure vessel in a vacuum;

second evacuation means for evacuating the inside of the vacuum casing; and valve means for connecting the high-pressure vessel and the accumulator so that series connection and parallel connection can be switched on the outlet side of the compressor.

2. A system for supplying a high-pressure medium gas according to claim 1, wherein the gas pressure in the accumulator is higher than the processing pressure in the high-pressure vessel, and the amount (Va) of the gas contained in the accumulator under standard conditions is $(1/(1-Pp/Pa))$ times as large as the amount (Vp) of the gas charged in the high-pressure vessel under standard conditions, wherein Pp is the processing pressure in the high-pressure vessel, and Pa is the highest discharge pressure of the compressor.

3. A system for supplying a high-pressure medium gas according to claim 2, wherein the gas flow rate (Q) of the compressor under standard conditions is $Q \, Vp/t_0$ wherein $t_0$ is the total cycle time of one processing.

4. A system for supplying a high-pressure medium gas according to any one of claims 1 to 3, further comprising a filter provided in a pipeline including the compressor and extending from the compressor to the high-pressure vessel.

5. A system for supplying a high-pressure medium gas according to any one of claims 1 to 3, wherein the first evacuation means is connected so as to evacuate through the inside of the high-pressure vessel.

6. A system for supplying a high-pressure medium gas according to any one of claims 1 to 3, further comprising a recovered gas tank provided in parallel with the gas holder through valve means.

7. A system for supplying a high-pressure medium gas according to claim 4, wherein the first evacuation means is connected so as to evacuate through the inside of the high-pressure vessel.

8. A system for supplying a high-pressure medium gas according to claim 4, further comprising a recovered gas tank provided in parallel with the gas holder through valve means.

9. A system for supplying a high-pressure medium gas according to claim 5, further comprising a recovered gas tank provided in parallel with the gas holder through valve means.

* * * * *